United States Patent
Hartzsch

(10) Patent No.: US 11,955,920 B2
(45) Date of Patent: Apr. 9, 2024

(54) METHOD FOR CONTROLLING AN ELECTRIC MOTOR HAVING A MECHANICAL COMMUTATOR

(71) Applicant: ELMOS SEMICONDUCTOR SE, Dortmund (DE)

(72) Inventor: Jörg Hartzsch, Dortmund (DE)

(73) Assignee: Elmos Semiconductor SE, Dortmund (DE)

( * ) Notice: Subject to any disclaimer, the term of this patent is extended or adjusted under 35 U.S.C. 154(b) by 47 days.

(21) Appl. No.: 17/762,351

(22) PCT Filed: Sep. 30, 2020

(86) PCT No.: PCT/EP2020/077290
§ 371 (c)(1),
(2) Date: Mar. 21, 2022

(87) PCT Pub. No.: WO2021/069269
PCT Pub. Date: Apr. 15, 2021

(65) Prior Publication Data
US 2022/0345059 A1 Oct. 27, 2022

(30) Foreign Application Priority Data
Oct. 8, 2019 (EP) .................................... 19201948

(51) Int. Cl.
*H02P 7/06* (2006.01)
*H02P 25/10* (2006.01)

(52) U.S. Cl.
CPC ................ *H02P 7/06* (2013.01); *H02P 25/10* (2013.01)

(58) Field of Classification Search
CPC .......... H02P 7/06; H02P 25/10; H02P 7/0094; H02P 7/29
See application file for complete search history.

(56) References Cited

U.S. PATENT DOCUMENTS

| | | | |
|---|---|---|---|
| 2011/0033322 A1* | 2/2011 | Barthel | H02P 7/0094 388/815 |
| 2013/0043820 A1* | 2/2013 | Knezevic | G05B 19/232 318/603 |
| 2017/0085198 A1* | 3/2017 | Scholz | H02P 29/50 |

FOREIGN PATENT DOCUMENTS

| | | |
|---|---|---|
| DE | 19511307 C1 | 1/1997 |
| DE | 4217265 C2 | 4/1998 |
| DE | 102008018818 A1 | 10/2009 |
| DE | 102010017835 A1 | 10/2011 |
| DE | 102016101905 A1 | 8/2017 |

OTHER PUBLICATIONS

International Search Report dated Dec. 1, 2020 in correlated International Application No. PCT/EP2020/077290.

* cited by examiner

*Primary Examiner* — Said Bouziane
(74) *Attorney, Agent, or Firm* — Mindful IP Law PLLC; Michael J. McCandlish

(57) ABSTRACT

A method for controlling an electric motor including a mechanical commutator, includes determining points in time at which commutation takes place by a sensor or without a sensor. The method further includes controlling the electric motor by a supply voltage signal having a sequence of pulses. The method further includes modulating the supply voltage signal by a modulation signal to reduce the magnitude of the supply voltage signal at the commutation points in time.

5 Claims, 3 Drawing Sheets

METHOD FOR CONTROLLING AN ELECTRIC MOTOR HAVING A MECHANICAL COMMUTATOR

CROSS REFERENCE TO RELATED APPLICATIONS

This application is a US National Phase of International Application Number PCT/EP2020/077290, filed Sep. 30, 2020, claiming priority to EP 19201948.7, filed Oct. 8, 2019, the contents of which are incorporated into the subject matter of the present application by reference.

TECHNICAL FIELD

The disclosure relates to a method for controlling an electric motor comprising a mechanical commutator.

BACKGROUND

Electric motors (for DC and for AC) comprise a commutator which is either mechanical and thus has brushes or is implemented electronically, which means that the electric motor is brushless. Brush-operated and thus mechanical commutators cause sparks to form on the brushes, which is why they wear out over time due to erosion. In addition, the so-called "brush fire" generates noise and unwanted electromagnetic radiations.

From DE-A-10 2010 017 835 a method for processing a motor size of a DC motor of a motor vehicle actuator as well as an actuating device therefor are known. The purpose of this known method and this known device is to ensure that supply voltage fluctuations are compensated for.

DE-A-10 2008 018 818 describes an electric motor control method with load torque adjustment, while DE-A-10 2016 101 905 discloses a method for controlling an electric motor for an adjustment element of a motor vehicle.

SUMMARY

An object of the disclosure is to provide a method for controlling an electric motor comprising a mechanical commutator, the brushes of which wear out less.

According to the disclosure, this object is achieved by proposing a method for controlling an electric motor comprising a mechanical commutator, in which method
the points in time at which commutation takes place can be determined by means of a sensor or without a sensor,
the electric motor is controlled by means of a supply voltage signal having a sequence of pulses, and
the supply voltage signal is modulated by means of a modulation signal to reduce its magnitude at the commutation points in time.

The electric motor according to the disclosure comprising a mechanical commutator is controlled by means of a supply voltage signal having a sequence of pulses. Said signal is typically a pulse-width modulated or a pulse-density modulated signal. According to the disclosure, said supply voltage signal is now additionally modulated by means of a modulation signal such that the effective magnitude of the supply voltage at the commutation points in time is reduced, namely reduced to substantially zero volts (for the meaning of "substantially zero volts", see below). This can reduce sparking, noise generation and electromagnetic radiation at the commutation points in time. This reduces, among other things, the risk of brush wear due to spark erosion.

Besides the two aforementioned modulation methods, pulse amplitude modulation (PMA), pulse-frequency modulation (PFM), pulse-width modulation (PWM), pulse-pause modulation (PPM), pulse-phase modulation (PPM), and pulse-position modulation (PPM), such as in the Manchester Code, are also suitable.

The method according to the disclosure requires knowledge of the commutation points in time. This can be done by methods generally known in prior art by means of a sensor or without a sensor. A Hall sensor is advantageously suitable as a sensor. Examples for sensorless determination of the commutation points in time by means of detecting current ripples in the rotor current signal are described in DE 42 17 265 C2 and DE 195 11 307 C1.

As already mentioned above, the supply voltage for the electric motor is provided by means of, for example, a pulse-width-modulated or pulse-density-modulated supply voltage signal. To ensure that this supply voltage signal having pulses leads to a reduced supply voltage at the commutation points in time, the pulse width or pulse density is modulated by means of the modulation signal so that ideally a supply voltage of substantially zero volts results at the commutation points in time. In this context, "substantially zero volts" means a magnitude of the supply voltage that is, for example, less than 20% or less than 15% or less than 10% or less than 5% of the nominal supply voltage. Despite this reduction in the magnitude of the supply voltage at the commutation points in time, however, the average magnitude of the supply voltage should remain at the level required for the current operation of the electric motor. In the case of a DC motor as an electric motor, this means that due to the modulation signal and the resulting additional modulation of the supply voltage signal having the pulses, its DC voltage component remains unchanged, which in this case is advantageously realized by the modulation signal being an alternating signal, for example a sinusoidal signal. The phase position of the modulation signal is selected such that the modulation signal assumes a minimum value at the commutation points in time.

In the method according to the disclosure, it is advantageous if at least minimal ripples appear in the rotor current signal during sensorless commutation timing detection. However, this does not necessarily have to be the case permanently. It is also possible that the ripples disappear completely, at least temporarily, since the control will only in the rarest cases be configured such that one permanently "ideally controls", which leads to the fact that no more ripples occur in the rotor current signal, ripples will therefore appear from time to time. However, this in itself is advantageous for the method according to the disclosure if the detection of the commutation points in time is sensorless. Because then the control can "switch on" again and again.

The situation is different when the commutation points in time are detected by means of an appropriate sensor system.

Further advantageous examples of the disclosure are subject matter of the dependent claims.

The disclosure makes it possible to upgrade existing electric motors, in particular DC electric motors, with a mechanical commutator, by means of the control according to the disclosure. The control method according to the disclosure also allows cost-effective electric motors with mechanical commutators to be used wherever brushless electric motors have previously been used for reasons of brush wear, disturbing noise, and EMC interference.

BRIEF DESCRIPTION OF THE DRAWINGS

In the following, the application is described in more detailed by means of an example and with reference to the drawings, in which.

DESCRIPTION

Figure 1:
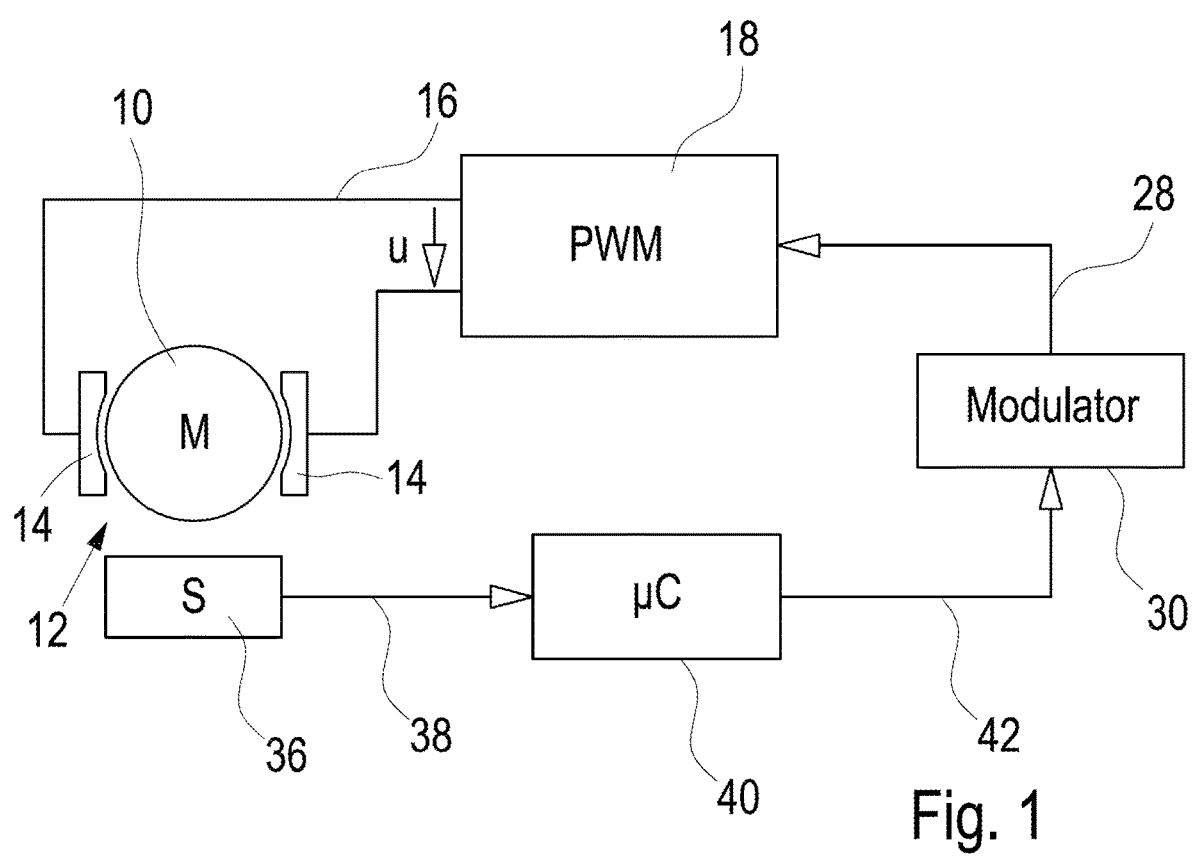
FIG. 1 schematically shows a block diagram illustrating the main components for controlling a DC electric motor according to the disclosure.

FIG. 1 shows a block diagram illustrating the control of a DC electric motor 10. The electric motor 10 is provided with a mechanical commutator 12 which typically has two brushes 14 to which the supply voltage U is applied. This supply voltage U is provided by means of a supply voltage signal 16 having pulses, in this exemplary example the signal being generated by a PWM generator 18. The PWM generator 18 generates a sequence of pulse-width modulated pulses that result in the DC voltage component that is used to drive the electric motor 10 based on the current load requirements.

Figure 2A:
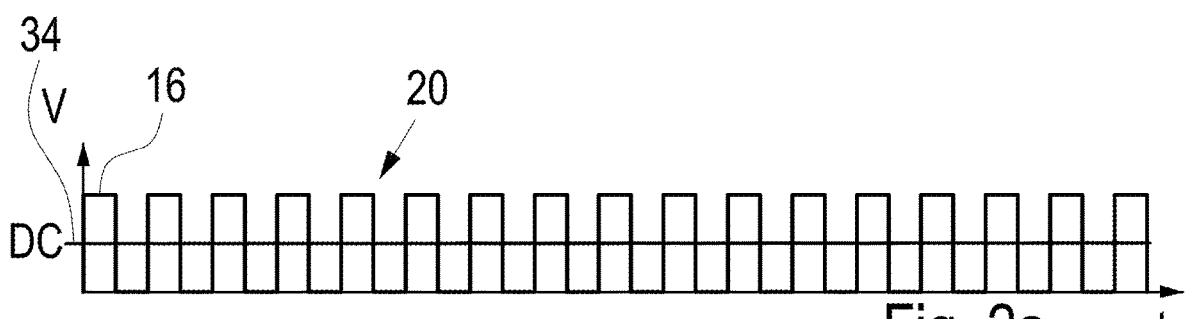
FIGS. 2a to 2e shows various signal characteristics for illustrating the modulated control of the DC electric motor according to the disclosure for reducing the wear of the brushes of the electric motor, here exemplarily with a sinusoidal characteristic and a realization via the modulation of the pulse width (i.e. by means of pulse-width modulation, FIG. 2d)
Figure 2B:
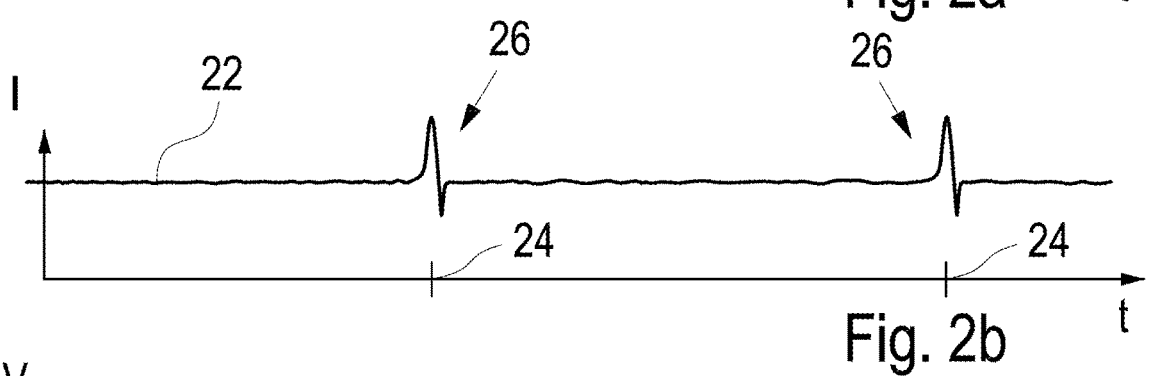

The pulse sequence of the supply voltage signal 16 is exemplarily shown in FIG. 2a. The pulse width of the individual pulses 20 is substantially static without the measure according to the disclosure if it is assumed that the load requirements do not change. FIG. 2b shows an exemplary characteristic of the rotor current curve 22 that can be encountered as it is established when the electric motor 10 is controlled with the supply voltage signal 16 according to FIG. 2a. At commutation points in time 24, current ripples 26 form in the rotor current signal 22, causing wear and malfunction, which is to be avoided.

Figure 2C:
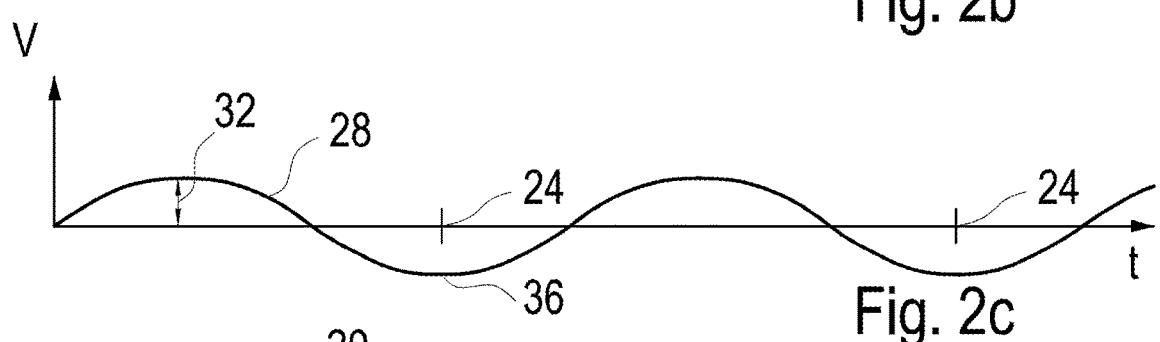

For this purpose, the supply voltage signal 16 having the pulse sequence is further modulated by means of a modulation signal 28 generated by a modulator 30. According to FIG. 2c, in this example the modulation signal 28 is a sinusoidal signal whose amplitude 32 has substantially the same magnitude as the DC voltage component 34 of the supply voltage U. The position and frequency of the modulation signal 28 are now selected such that the minima of the sinusoidal signal (modulation signal 28) are each in phase with the commutation points in time 24. This modulation of the supply voltage signal 16 does not change its DC component 34, but it does change the magnitude of the supply voltage U at the commutation points in time 24, here exemplarily to zero volts.

In this example, the commutation points in time 24 are determined according to the block diagram of FIG. 1 by a sensor 36 whose output signal 38 is fed to a control unit 40 in the form of a microcontroller, for example, which in turn outputs an output signal 42 to the modulator 30. Alternatively, it is also possible that the output signal 38 of the sensor 36, which is typically a Hall sensor, is directly provided to the modulator 30. An evaluation computing unit, such as a microcontroller, may be required if the commutation points in time 24 are determined without sensors. The corresponding technologies and method for sensorless determination of the commutation points in time 24 of an electric motor are generally known and shall not be further described here.

Figure 2D:
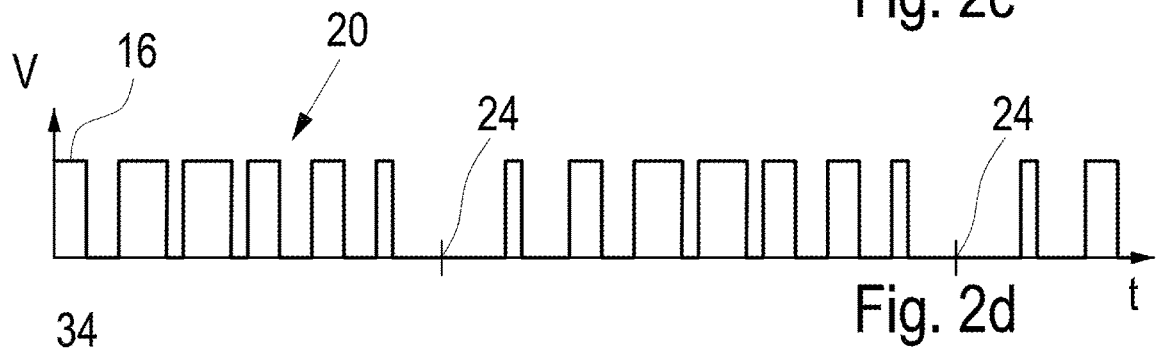
Figure 2E:
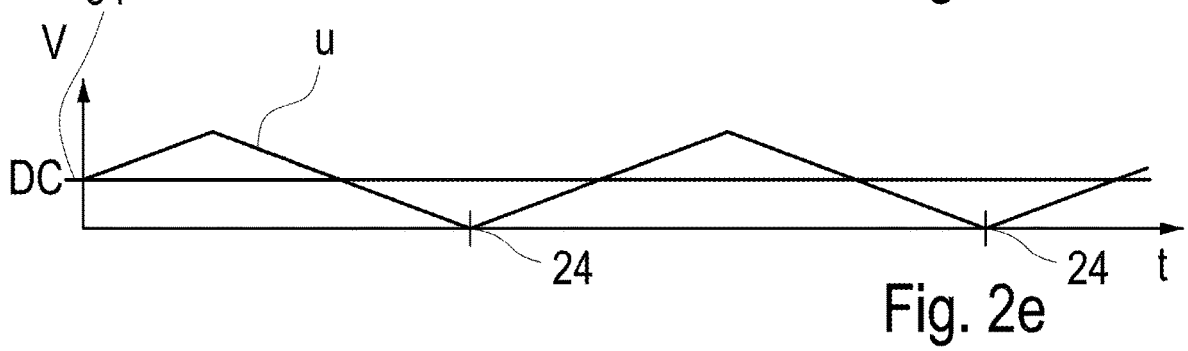

The result of the modulation of the supply voltage signal is exemplarily indicated in FIG. 2d. Consequently, the time characteristic of the supply voltage U alternates between substantially zero volts at the commutation points in time 24 and twice the DC component 34 in the middle of the intervals between two successive commutation points in time 24, as shown in FIG. 2e, so that the DC component 34 remains unchanged on average compared to the situation described with reference to FIG. 2a.

Figure 3A:
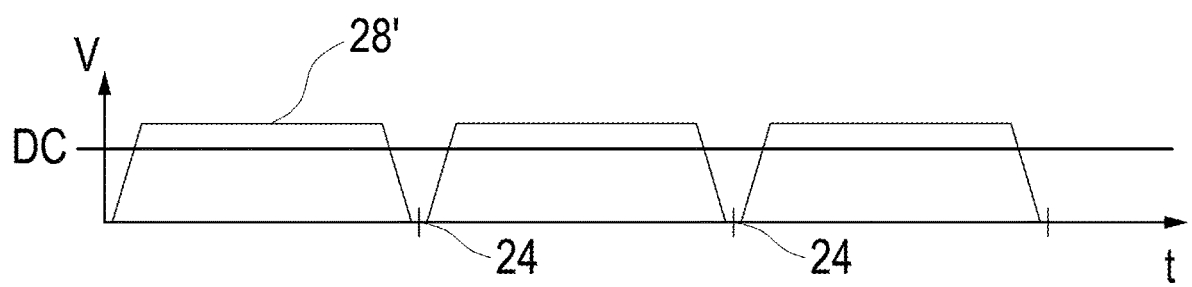
FIGS. 3a and 3b show the characteristic of alternative modulation signals.
Figure 3B:
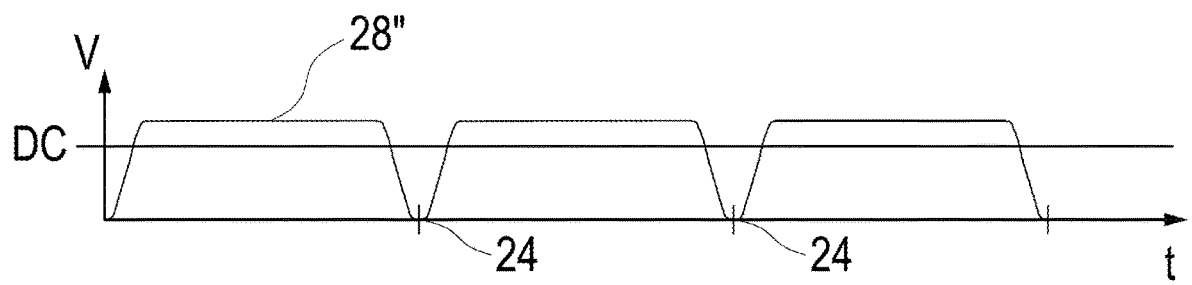

In FIGS. 3a and 3b, two further examples are given in which the characteristic of alternative modulation signals 28' and 28" are shown.

LIST OF REFERENCE SYMBOLS 10 electric motor
12 commutator
14 brushes
16 supply voltage signal
18 PWM generator
20 pulses of supply voltage signal
22 rotor current signal
24 commutation points in time
26 current ripples in rotor current signal
28 modulation signal
28' modulation signal
28" modulation signal
30 modulator
32 amplitude of modulation signal
34 DC component
36 sensor
38 output signal of sensor
40 control unit
42 output signal of control unit
U supply voltage

What is claimed is:

1. A method for controlling an electric motor comprising a mechanical commutator, the method comprising:
   determining points in time at which commutation takes place by a sensor or without a sensor,
   controlling the electric motor by a supply voltage signal having a sequence of pulses, and
   modulating the supply voltage signal by a modulation signal to reduce a magnitude of the supply voltage signal at the commutation points in time, wherein the modulation signal is in phase with the commutation points in time such that a minimum value of the modulation signal coincides with the commutation points in time.

2. The method according to claim 1, wherein when the commutation points in time are determined by the sensor, a Hall sensor is used, and in that, when the commutation points in time are determined without the sensor, the commutation points in time are determined by an analysis of a rotor current signal.

3. The method according to claim 1, wherein the supply voltage signal is pulse-width modulated or pulse-density modulated, and in that a pulse width and a pulse density, respectively, is modulated for reducing the magnitude of the supply voltage signal at the commutation points in time by means of the modulation signal.

4. The method according to claim 1, wherein the magnitude of the supply voltage signal at the commutation points in time is reduced by means of the modulation signal to substantially zero volts.

5. The method according to claim 1, wherein the electric motor is a DC motor, in that a pulse width of the supply voltage signal having a sequence of pulses has a constant component, and in that a modulation signal of the pulse width is a sinusoidal signal whose amplitude is substantially equal to the constant component of the pulse width of the supply voltage signal and respectively assumes a minimum value at the commutation points in time.

\* \* \* \* \*